United States Patent [19]

Crystal et al.

[11] Patent Number: 5,364,462
[45] Date of Patent: Nov. 15, 1994

[54] WATERFAST INKS

[75] Inventors: Richard Crystal, Los altos, Calif.; Raymond Geffre, Fort Fairfield, Me.

[73] Assignee: Graphic Utilities, Incorporated, Waltham, Mass.

[21] Appl. No.: 151,576

[22] Filed: Nov. 12, 1993

Related U.S. Application Data

[63] Continuation of Ser. No. 31,074, Mar. 11, 1993, abandoned, which is a continuation of Ser. No. 745,067, Aug. 14, 1991, abandoned.

[51] Int. Cl.$^5$ ............................................. C09D 11/02
[52] U.S. Cl. ................... 106/22 R; 106/20 R; 8/551
[58] Field of Search ................ 106/22 R, 20 R; 8/551

[56] References Cited

U.S. PATENT DOCUMENTS

| | | | |
|---|---|---|---|
| 3,753,931 | 8/1973 | Raspanti | 162/164.3 |
| 4,076,497 | 2/1978 | Freyberg et al. | 8/551 |
| 4,150,997 | 4/1979 | Hayes | 106/15.05 |
| 4,155,768 | 5/1979 | Adams | 106/23 |
| 4,167,393 | 9/1979 | de Roo | 8/7 |
| 4,197,135 | 4/1980 | Bailey et al. | 106/22 |
| 4,238,234 | 12/1980 | Lang | 106/22 |
| 4,267,088 | 5/1981 | Kempf | 260/29.2 |
| 4,299,630 | 11/1981 | Hwang | 106/22 |
| 4,383,859 | 5/1983 | Moore et al. | 106/22 |
| 4,520,143 | 5/1985 | Jellinek | 523/210 |
| 4,585,484 | 4/1986 | Haruta et al. | 106/22 |
| 4,588,413 | 5/1986 | Keil et al. | 8/551 |
| 4,601,756 | 7/1986 | Chiba et al. | 106/22 |
| 4,627,875 | 12/1986 | Kobayashi et al. | 106/22 |
| 4,659,382 | 4/1987 | Kang | 106/22 |
| 4,664,708 | 5/1987 | Allen | 106/22 |
| 4,789,400 | 12/1988 | Solodar et al. | 106/22 |
| 4,791,165 | 12/1988 | Bearss et al. | 524/516 |
| 4,793,264 | 12/1988 | Lin et al. | 106/22 |
| 4,836,851 | 6/1989 | Pawlowski et al. | 106/22 |
| 5,017,224 | 5/1991 | Tomita et al. | 106/22 |
| 5,017,644 | 5/1991 | Fuller et al. | 106/22 |
| 5,019,164 | 5/1991 | Tomita et al. | 106/20 |

OTHER PUBLICATIONS

Kang, H. R. (19910 J. Imag. Sci 35 pp. 179–201.

*Primary Examiner*—Helene Klemanski
*Attorney, Agent, or Firm*—Bromberg & Sunstein

[57] ABSTRACT

The present invention provides improved dye based ink solutions for use in ink jet printing. In one embodiment of the invention, an aqueous ink with improved water solubility and waterfastness is provided that includes a dye component and a hydroxyethylated polyethylene imine polymer, wherein the hydroxyethylated polyethylene imine polymer has incorporated therein approximately 10 to 55 percent hydroxyethyl groups by weight. Alternative embodiments of the invention include the use of hydroxypropylated polyethylene imine polymers or epichlorohydrin-modified polyethylene imine polymers. In addition, aprotic solvents such as dimethyl sulfoxide and tetramethylene sulfone may be added to improve the solubility and stability of the dye solution, and humectants such as 2-pyrrolidone may be added. According to the methods of the invention, an ink with improved stability, jetting characteristics, solubility and waterfastness may be provided.

61 Claims, No Drawings

WATERFAST INKS

This is a continuation of application Ser. No. 08/031,074 filed on Mar. 11, 1993, now abandoned which is a continuation of application Ser. No. 07/745,067 filed on Aug. 14, 1991, now abandoned.

TECHNICAL FIELD

This application relates to recording liquids or inks for use in ink jet printing or other printing technologies where water based inks are important.

BACKGROUND ART

Water based ink-jet ink formulation and technology have been reviewed. Kang, H. R. J. Imag. Sci. (1991) 35 pp. 179-201. Ink-jet ink formulation has been the subject of many studies. Moore (1983) U.S. Pat. No. 4,383,859, assigned to IBM Corp.; and Bearss et al. (1988) U.S. Pat. No. 4,791,165, assigned to Hewlett-Packard. For example, in the prior art, an ink jet printer ink utilizing a water soluble dye and a polyamine containing 7 or more nitrogen atoms per molecule, having a pH of 8 or greater, with improved water fastness has been disclosed. Bailey et al. (1980) U.S. Pat. No. 4,197,135, assigned to IBM, Corp. Adams et al. discloses a waterfast ink for use in ink jet printers that includes a polyamine having 6 or fewer nitrogen atoms per molecule, having a pH of 8 or below. Adams et al. (1979) U.S. Pat. No. 4,155,768, assigned to IBM Corp.

Coatings and inks resistant to solvents have been disclosed, in which epichlorohydrin-modified and ethylene oxide-modified polyethylene imines cooperate in aqueous solution. Kempf (1981) U.S. Pat. No. 4,267,088.

Solodar et al. discloses the use of an aqueous ink jet dye solution that includes a dye and a hydroxypropylated polyethylene imine having a molecular weight of about 1,000 to about 10,000. Solodar et al. (1988) U.S. Pat. No. 4,789,400, assigned to Xerox Corp.

Kang discloses an aqueous ink jet dye solution that includes a hydroxyethylated polyethylene imine polymer that has incorporated in it from about 65 percent to 80 percent by weight of hydroxyethyl groups. Kang (1987) U.S. Pat. No. 4,659,382, assigned to Xerox Corp.

The ink jet printing ink of Hwang includes a dye, polyethylene imine, an alkaline reagent, 1 to 5 percent by weight diethylene glycol and a 4-10 percent by weight of a humectant. Hwang (1981) U.S. Pat. No. 4,299,630. The use of a waterfast ink jet ink solution that includes a water soluble reactive dye covalently bonded to polyethylene imine has been disclosed. Allen (1987) U S Pat No. 4,664, 708, assigned to Xerox Corp. Lang discloses a printing ink containing a high molecular weight polyether amine fixing agent. Lang (1980) U.S. Pat. No. 4,238,234. However, high molecular weight polymers have the problem of a tendency to increase viscosity and aggravate clogging problems. de Roo has described the use of the reaction product of a 40,000 MW polyethylene imine and 3-chloro-2-hydroxy-propyl trimethylammonium chloride for binding a water soluble direct dye to paper. de Roo (1979) U.S. Pat. No. 4,167,393. Polyethylene imines have been used in aqueous inks. Meisner et al. (1967) French Pat. No. 1,480,068. Polyethylene imines have also been used in the treatment of textile materials. Jellinek (1985) U.S. Pat. No. 4,520,143.

Haruta et al. disclose an aqueous dye solution that includes a dye, polyethylene glycol or polyethylene glycol monomethyl ether; diethylene glycol or sulfolane; and n-methyl-2-pyrrolidone or 1,3-dimethyl-2-imidazolidinone. Haruta et al. (1986) U.S. Pat. No. 4,585,484, assigned to Canon. Kobayashi et al. disclose an aqueous dye solution that includes polyethylene glycol or polyethylene glycol monomethylether; diethyleneglycol or sulfolane; and N-methyl-2-pyrrolidone or 1,3-dimethyl-2-imidazolidinone. Kobayashi et al. (1986) U.S. Pat. No. 4,627,875, assigned to Canon. Dyes containing polyhydroxyl groups for ink jet printing inks have been described. Pawlowski et al. (1989) U.S. Pat. No. 4,836,851, assigned to Hewlett-Packard Co. Aqueous printing inks that include an anionic dye and a cationic fixing agent based on a high molecular weight cross linked polyether amine have been described. Lang (1980) U.S. Pat. No. 4,238,234, assigned to Sandoz, Ltd.

SUMMARY OF THE INVENTION

The present invention provides improved dye based ink solutions for use in ink jet printing. In one embodiment of the invention, an aqueous ink with improved water solubility and waterfastness is provided that includes a dye component and a hydroxyethylated polyethylene imine polymer, wherein the hydroxyethylated polyethylene imine polymer has incorporated therein approximately 10 to 55 percent hydroxyethyl groups by weight and is formed from a polyethylene imine polymer having an average molecular weight of less than 1000. Alternative embodiments of the invention include the use of hydroxypropylated polyethylene imine polymers or epichlorohydrin-modified polyethylene imine polymers. In addition, aprotic solvents such as dimethyl sulfoxide and tetramethylene sulfone may be added to improve the solubility and stability of the dye solution, and humectants such as 2-pyrrolidone may be added. According to the methods of the invention, an ink with improved stability, jetting characteristics, solubility and waterfastness may be provided.

DETAILED DESCRIPTION OF SPECIFIC EMBODIMENTS

The present invention provides ink jet dye compositions for ink jets with improved density, print quality and jetting characteristics that may be used with Hewlett Packard, Canon or other manufacturer's ink jet printers, which utilize the bubble jet principle for the delivery of a drop of ink to the surface of paper propelled by the rapid vaporization of the ink vehicle such as water. The dye compositions may be adapted to specific manufacturer's ink jet devices as needed. The dye compositions of the invention are waterfast, and resist clogging and precipitating on standing. The ink formulations of the present invention may be used to refill ink cartridges to allow the convenient reuse of the cartridges for an improved effect on the environment, in comparison with cartridges that are disposable after a single use. In addition, the ink formulations of this invention are well suited to other ink jet printing technologies including piezoelectric drop-on-demand and continuous ink jet.

According to one embodiment of the invention, a dye may be added to a polyethylene imine polymer solution, to form a dipolar ion of the polyethylene imine polymer and the dye, which greatly improves the solubility and waterfastness of the dye solution without affecting the viscosity of the solution. The solubility and waterfastness may be substantially improved if a partially or fully nitrogen substituted polyethylene imine polymer is utilized, such as a hydroxyethylated, hydroxypropylated, hydroxybutylated, epichlorohydrin-modified or glycidol-modified polyethylene imine polymer or a combination thereof. The solubility, stability and waterfastness of the dye solution may be most. effectively enhanced without objectionable increase in viscosity using a polyethylene imine polymer having an average molecular weight of 3,000 or less.

The solubility of the N-substituted polyethylene imine polymer-dye complexes in the ink jet dye solutions of the invention may also be substantially improved by buffering the solution to a pH greater than approximately 9.0. Buffering the dye solution to a higher pH provides a considerable reduction in unwanted precipitation and clogging of ink jets. The buffers that may be used include the base; triethanolamine, aqueous sodium hydroxide, aqueous lithium hydroxide and aqueous potassium hydroxide.

The hydroxyethylated and hydroxypropylated polyethylene imine polymer-dye complexes in the ink jet dye solutions of the invention are highly soluble in a basic buffered solution and are less soluble in an acidic solution. The solubility and stability of the ink solutions may be improved by adding the base to the solution before the dye. When the dye solution is applied to an acidic paper surface, the dye solution becomes acidic and the polyethylene imine polymer-dye complex precipitates out of solution and adheres to the paper surface. This provides ink print with improved water resistance and reduces smudging and bleeding of the ink.

The epichlorohydrin-modified polyethylene imine polymers are highly soluble in acidic solution and less soluble in basic environments and therefore result in greater waterfastness on alkaline sized papers. Mixtures of substituted polyethylene imine polymers may be used, which may improve stability and improve the variety of papers that may be used.

Humectants such as glycols, N-methyl-pyrrolidone or 2-pyrrolidone may be included in the dye solution to prevent water evaporation and sedimentation. Certain humectants such as N-methyl-pyrrolidone and 2-pyrrolidone have been found to improve dye solubility and thus serve the dual role as humectant and dye solubilizer. In addition 2-pyrrolidone has been unexpectedly found to resist ink build-up on jet faces during extended printing required for cartridge refillability. Approximately 1 to 10 percent 2-pyrrolidone by weight may be added to the dye solution to prevent sediment build-up on print heads. In addition, biocides may be added to prevent the growth of microorganisms.

Aprotic water soluble solvents may be added to improve the solubility and stability of the ink upon standing. Aprotic solvents found to improve performance include dimethyl sulfoxide (DMSO), dimethyl thiophene, tetramethylene sulfone (sulfolane) sulfoxamide, dimethyl formamide (DMF), hexamethylphosphorotriamide (HMPT) and butadiene sulfone. Sulfur containing solvents appear to give best results. For example, the addition of 1 to 15% by weight dimethyl sulfoxide or tetramethylene sulfone to the ink dye solutions may improve performance by preventing drying or plugging of jets during storage. The combination of aprotic solvents and 2-pyrrolidone may be utilized to improve the ability of the ink to fire instantly after storage when jet faces are exposed to air, to provide a synergistic effect. Long chain glycols such as neopentyl glycol may be added to stabilize jetting.

The dye solutions of the invention may be adjusted for use with a wide range of dyes including acid, direct and reactive dyes. The Colour Index method of classification is used where appropriate. The black dyes that may be utilized include Direct Blacks 17, 19, 154, 163, and 168, Acid Black 2, Food Black 2, and Reactive Black 31. Other black dyes that may be utilized include certain mixtures represented by Black SP liquid available from Mobay Chemical and Basacid Black X-34 available from BASF. The magenta dyes that may be utilized according to the methods of the invention include Acid Reds 52, 87, 289, Reactive Reds 23 and 180 and Direct Reds 239 and 254. Yellow dyes such as Direct Yellows 5, 11, 86, and 157, Acid Yellows 3, 23, 36, 73 and 79 and Reactive Yellow 37 may also be utilized, or cyan dyes such as Direct Blues 86 and 199 and Acid Blues 9 and 15. In addition, water soluble nigrosine dyes may be used.

Examples 1 to 13

A series of inks (Examples 1 to 13) were prepared as indicated in Tables 1 and 2, in which the amount of 40% by weight hydroxyethylated polyethylene imine polymer was varied along with the amount and type of humectant and buffering agent. Examples 12 and 13, which contained no polymer, exhibited moderate to low waterfastness. Examples 1, 2 and 3 exhibited good waterfastness, but the polymer was prone to precipitation, causing jet plugging when tested in a Hewlett Packard Desk Jet cartridge. When 3 parts by weight of 1.0N NaOH (Example 4) were added, excellent stability was noted and the ink jetted well for two successive refills at which time some jets began to fail. Reduction to 3 parts polymer (Example 5) extended performance to five successive refills before jet failure without loss of waterfastness. Substitution of N-methyl pyrrolidone for glycol resulted in extended life to ten refills without jet failure. No difference was detected between Examples 6–8, which used 1.0N NaOH, LiOH, and KOH as buffers, resulting in a desired pH of 10.0. Excellent jetting and excellent waterfastness were achieved with Examples 6–8. Example 9, using triethanolamine as a buffer did not result in a stabilized solution even though it had a pH of 10.0.

Substitution of 2-pyrrolidone (Example 10) for N-methyl pyrrolidone (Example 6) resulted in the same good performance with the added advantage that the jet faces remained clean, even after 10 successive refills. Reduction in dye in Example 11 resulted in improved waterfastness without sacrifice in print density. Examples 1 to 13 teach that best results are obtained when using the least amounts of dye and polymer while still maintaining required water fastness and optical density levels. Additionally, these examples show the importance of maintaining pH greater than 9 to maintain stability and the improvement in jet life with N-methyl pyrrolidone and 2-pyrrolidone.

EXAMPLES 14 to 19

In order to improve standing ability of cartridges exposed to air, certain aprotic solvents were added to the best formulations of Examples to 1 to 11, as indicated in Table 4. Formulations were tested by exposing ink filled cartridges to air for 24 hours followed by print testing. Table 3 compares Example 11 to Examples 14–19. While Example 11 required 5 to 10 lines of print before all jets fired, marked improvement was realized with use of aprotic solvents without degradation of jet performance, print quality, or waterfastness. Example 19, in which the aprotic solvent of Example 17 is not present, demonstrates the efficacy of aprotic solvents.

EXAMPLES 20 to 24

The procedures of Examples 14–18 were followed except that BASF Basacid X-34 was substituted for Black SP. The resultant ink behaved identically except that the color shade of black was slightly more blue. Waterfastness, optical density, stability and storagability remained excellent and the pH was 10.0.

EXAMPLES 25

Direct Black 19 obtained from Mobay (Black G uncut) was substituted for Black SP as in Example 18. The resultant ink showed excellent waterfastness but a pH of 11.7 was realized. Reducing the amount of buffer resulted in decreased stability. This pH is undesirable because of safety.

TABLE 1

| Composition | Examples 1 to 6 | | | | | |
|---|---|---|---|---|---|---|
| (Parts by Weight) | Example Number: | | | | | |
| | 1 | 2 | 3 | 4 | 5 | 6 |
| 40% Hydroxyethylated polyethylene imine | 5.0 | 5.0 | 7.1 | 5.0 | 3.0 | 3.0 |
| N-Methylpyrrolidone | | | | | | |
| 2-Pyrrolidone | | | | | | 10.0 |
| Diethyleneglycol | 12.0 | | 12.0 | 12.0 | 12.0 | |
| Ethyleneglycol | | 12.0 | | | | |
| Dimethylsulfoxide | | | | | | |
| Tetramethylene sulfone | | | | | | |
| 1.0N NaOH | | | | 3.0 | 3.0 | 3.0 |
| 1.0N LiOH | | | | | | |
| 1.0N KOH | | | | | | |
| Triethanolamine | | | | | | |
| Black SP | 12.9 | 12.9 | 12.9 | 12.9 | 12.9 | 12.9 |
| Water | 95.1 | 95.1 | 93.0 | 92.1 | 94.1 | 96.1 |

TABLE 2

| Composition (Parts by Weight) | Examples 7 to 13 | | | | | | |
|---|---|---|---|---|---|---|---|
| | Example Number: | | | | | | |
| | 7 | 8 | 9 | 10 | 11 | 12 | 13 |
| 40% Hydroxyethylated polyethylene imine | 3.0 | 3.0 | 3.0 | 3.0 | 3.0 | 0 | 0 |
| N-Methylpyrrolidone | 10.0 | 10.0 | 10.0 | | | 10 | |
| 2-Pyrrolidone | | | | 10.0 | 10.0 | | |
| Diethyleneglycol | | | | | | | 12 |
| Ethyleneglycol | | | | | | | |
| Dimethylsulfoxide | | | | | | | |
| Tetramethylene sulfone | | | | | | | |
| 1.0N NaOH | | | | 3.0 | 3.0 | | |
| 1.0N LiOH | 3.0 | | | | | | |
| 1.0N KOH | | 3.0 | | | | | |
| Triethanolamine | | | 4.0 | | | | |
| Black SP | 12.9 | 12.9 | 12.9 | 12.9 | 10.7 | 12.9 | 12.9 |
| Water | 96.1 | 96.1 | 95.1 | 96.1 | 98.3 | 102.1 | 100.1 |

TABLE 3

| 24 Hour Air Exposure Test: | | | | | | |
|---|---|---|---|---|---|---|
| Example: | 11 | 19 | 14 | 15 | 16 | 17 | 18 |
| Lines* | 5 | 5 | 2 | <1 | 2 | <1 | instant print |

*Lines of Print before all jets fired

TABLE 4

| Composition (Parts by Weight) | Examples 11 and 14–19 | | | | | | |
|---|---|---|---|---|---|---|---|
| | Example Number: | | | | | | |
| | 11 | 14 | 15 | 16 | 17 | 18 | 19 |
| 40% Hydroxyethylated polyethylene imine | 3.0 | 3.0 | 3.0 | 3.0 | 3.0 | 3.0 | 3.0 |
| N-Methylpyrrolidone | | | | | | | |
| 2-Pyrrolidone | 10.0 | 10.0 | 10.0 | 10.0 | 10.0 | 10.0 | 20.0 |
| Diethyleneglycol | | | | | | | |
| Ethyleneglycol | | | | | | | |
| Dimethylsulfoxide | | 5.0 | 10.0 | | | | |
| Tetramethylene sulfone | | | | 5.0 | 10.0 | 12.5 | |
| 1.0N NaOH | 3.0 | 3.0 | 3.0 | 3.0 | 3.0 | 3.0 | 3.0 |
| 1.0N LiOH | | | | | | | |
| 1.0N KOH | | | | | | | |
| Triethanolamine | | | | | | | |
| Black SP | 10.7 | 10.7 | 10.7 | 10.7 | 10.7 | 10.7 | 10.7 |
| Water | 98.3 | 93.3 | 88.3 | 93.3 | 88.3 | 85.8 | 88.3 |

EXAMPLE 26

Food Black 2 obtained from Mobay was substituted for Black SP of Example 18. Only moderate waterfastness was obtained.

EXAMPLE 27

Black 168 was obtained from ICI and substituted as in Example 18. Excellent properties were obtained but a pH of 12.0 was needed to maintain stability.

EXAMPLE 28

Acid Black 2 was obtained from Mobay and substituted for Black SP as in Example 18. Moderate waterfastness was obtained at pH 11.7.

EXAMPLE 29

Direct Blue 199 was obtained from Hoescht Chemical and substituted for Black SP as in Example 18. Excellent properties were obtained at a pH of 11.0.

EXAMPLES 30 to 35

Hydroxypropylated polyethylene imine polymer was substituted for hydroxyethylated polyethylene imine polymer as in Examples 14–18 and 24. Identical results were obtained.

EXAMPLE 36 to 40

Epichlorohydrin-modified polyethylene imine polymer was substituted for hydroxyethylated polyethylene imine polymer, as in Examples 15–18 and 20. No buffer was required and resultant inks remained stable at pH 6.0. Waterfastness on acidic papers was good, but waterfastness on calcium carbonate sized alkaline papers was excellent.

EXAMPLES 41 to 45

Hydroxyethylated polyethylene imine polymer was substituted with a 4:1 mixture by weight of hydroxyethylated polyethylene imine polymer:epichlorohydrin-modified polyethylene imine polymer, as in Examples 15–18 and 20. The resultant ink exhibited waterfastness over a wide range of both acidic and alkaline papers.

What is claimed is:

1. A dye solution suitable for ink jet printing comprising:
   a dye component; and
   a polyethylene imine polymer having an average molecular weight of less than approximately 3000 selected from the group consisting of
   (a) a hydroxyethylated polyethylene imine polymer having incorporated therein approximately 10–55% hydroxyethyl groups by weight,
   (b) a hydroxypropylated polyethylene imine polymer formed from an polyethylene imine polymer having an average molecular weight less then 1000,
   (c) an epichlorohydrin-modified polyethylene imine polymer,
   (d) a hydroxybutylated polyethylene imine polymer and
   (e) a glycidol-modified polyethylene imine polymer.

2. A dye solution according to claim 1, wherein the dye component is selected from the group consisting of acid, direct and reactive dyes.

3. A dye solution according to claim 2, wherein the dye component is selected from the group consisting of Direct Black 17, Direct Black 19, Direct Black 154, Direct Black 163, Direct Black 168, Black SP liquid and Basacid Black X-34 liquid.

4. A dye solution according to claim 3, wherein the solution is aqueous and buffered with a base selected from the group consisting of triethanolamine, aqueous sodium hydroxide, aqueous lithium hydroxide and aqueous potassium hydroxide.

5. A dye solution according to claim 4, wherein the buffer is aqueous sodium hydroxide, and wherein the pH of the solution is adjusted to approximately pH 10.

6. A dye solution according to claim 4, wherein the buffer is aqueous sodium hydroxide, and wherein the pH of the solution is adjusted to approximately pH 12.

7. A dye solution according to claim 2, further comprising a humectant.

8. A dye solution according to claim 4, further comprising a humectant.

9. A dye solution according to claim 7, wherein the humectant is selected from the group consisting of n-methyl-pyrrolidone and 2-pyrrolidone.

10. A dye solution according to claim 8, wherein the humectant is selected from the group consisting of n-methyl-pyrrolidone and 2-pyrrolidone.

11. A dye solution according to claim 9, wherein the humectant is 2-pyrrolidone and wherein the concentration of 2-pyrrolidone is approximately 1 to 10 percent by weight.

12. A dye solution according to claim 10, wherein the humectant is 2-pyrrolidone and wherein the concentration of 2-pyrrolidone is approximately 1 to 10 percent by weight.

13. A dye solution according to claim 2, further comprising an aprotic solvent.

14. A dye solution according to claim 13, wherein the aprotic solvent is selected from the group consisting of dimethyl formamide and hexamethyl phosphorotriamide.

15. A dye solution according to claim 13, wherein the aprotic solvent is a sulfur containing composition selected from the group consisting of tetramethylene sulfone, dimethyl sulfoxide, sulfoxamide, butadiene sulfone and dimethyl thiophene.

16. A dye solution according to claim 4, further comprising an aprotic solvent.

17. A dye solution according to claim 16, wherein the aprotic solvent is selected from the group consisting of dimethyl formamide and hexamethyl phosphorotriamide.

18. A dye solution according to claim 16, wherein the aprotic solvent is a sulfur containing composition selected from the group consisting of tetramethylene sulfone, dimethyl sulfoxide, sulfoxamide, butadiene sulfone and dimethyl thiophene.

19. A dye solution according to claim 9, further comprising an aprotic solvent.

20. A dye solution according to claim 19, wherein the aprotic solvent is selected from the group consisting of dimethyl formamide and hexamethyl phosphorotriamide.

21. A dye solution according to claim 19, wherein the aprotic solvent is a sulfur containing composition selected from the group consisting of tetramethylene sulfone, dimethyl sulfoxide, sulfoxamide, butadiene sulfone and dimethyl thiophene.

22. A dye solution according to claim 15, wherein the sulfur containing composition is tetramethylene sulfone; and
   wherein the tetramethylene sulfone is included in the solution at a concentration of approximately 1 to 15 percent by weight.

23. A dye solution according to claim 18, wherein the sulfur containing composition is tetramethylene sulfone; and
   wherein the tetramethylene sulfone is included in the solution at a concentration of approximately 1 to 15 percent by weight.

24. A dye solution according to claim 21, wherein the sulfur containing composition is tetramethylene sulfone; and
   wherein the tetramethylene sulfone is included in the solution at a concentration of approximately 1 to 15 percent by weight.

25. A dye solution according to claim 1, further comprising a biocide.

26. A dye solution according to claim 1, further comprising a glycol.

27. A dye solution according to claim 26, wherein the glycol is neopentyl glycol.

28. A dye solution according to claim 4, wherein the base is added to the solution prior to the addition of the dye.

29. A method for the production of a dye solution suitable for ink jet printing comprising:
   (i) obtaining a dye component and a polyethylene imine polymer having an average molecular weight of less than approximately 3000 selected from the group consisting of
   (a) a hydroxyethylated polyethylene imine polymer having incorporated therein approximately 10–55% hydroxyethyl groups by weight,
   (b) a hydroxypropylated polyethylene imine polymer formed from an polyethylene imine polymer having an average molecular weight less then 1000,
   (c) an epichlorohydrin -modified polyethylene imine polymer,
   (d) a hydroxybutylated polyethylene imine polymer and
   (e) a glycidol-modified polyethylene imine polymer.

30. A method according to claim 29, wherein the dye component is selected from the group consisting of acid, direct and reactive dyes.

31. A method according to claim 30, wherein the dye component is selected from the group consisting of Direct Black 17, Direct Black 19, Direct Black 154, Direct Black 163, Direct Black 168, Black SP liquid and Basacid Black X-34 liquid.

32. A method according to claim 30, further comprising, adding water to the solution and buffering the solution with a base selected from the group consisting of triethanolamine, aqueous sodium hydroxide, aqueous lithium hydroxide and aqueous potassium hydroxide.

33. A method according to claim 32, wherein the buffer is aqueous sodium hydroxide, and wherein the pH of the solution is adjusted to approximately pH 10.

34. A method according to claim 32, wherein the buffer is aqueous sodium hydroxide, and wherein the pH of the solution is adjusted to approximately pH 12.

35. A method according to claim 30, further comprising adding a humectant.

36. A method according to claim 32, further comprising adding a humectant.

37. A method according to claim 35, wherein the humectant is selected from the group consisting of n-methyl-pyrrolidone and 2-pyrrolidone.

38. A method according to claim 36, wherein the humectant is selected from the group consisting of n-methyl-pyrrolidone and 2-pyrrolidone.

39. A method according to claim 37, wherein the humectant is 2-pyrrolidone and wherein the concentration of 2-pyrrolidone is approximately 1 to 10 percent by weight.

40. A method according to claim 38, wherein the humectant is 2-pyrrolidone and wherein the concentration of 2-pyrrolidone is approximately 1 to 10 percent by weight.

41. A method according to claim 30, further comprising adding an aprotic solvent.

42. A method according to claim 41, wherein the aprotic solvent is selected from the group consisting of dimethyl formamide and hexamethyl phosphorotriamide.

43. A method according to claim 41, wherein the aprotic solvent is a sulfur containing composition selected from the group consisting of tetramethylene sulfone, dimethyl sulfoxide, sulfoxamide, butadiene sulfone and dimethyl thiophene.

44. A method according to claim 32, further comprising adding an aprotic solvent.

45. A method according to claim 44, wherein the aprotic solvent is selected from the group consisting of dimethyl formamide and hexamethyl phosphorotriamide.

46. A method according to claim 44, wherein the aprotic solvent is a sulfur containing composition selected from the group consisting of tetramethylene sulfone, dimethyl sulfoxide, sulfoxamide, butadiene sulfone and dimethyl thiophene.

47. A method according to claim 37, further comprising adding an aprotic solvent.

48. A method according to claim 37, wherein the aprotic solvent is selected from the group consisting of dimethyl formamide and hexamethyl phosphorotriamide.

49. A method according to claim 47, wherein the aprotic solvent is a sulfur containing composition selected from the group consisting of tetramethylene sulfone, dimethyl sulfoxide, sulfoxamide, butadiene sulfone and dimethyl thiophene.

50. A method according to claim 43, wherein the sulfur containing composition is tetramethylene sulfone; and wherein the tetramethylene sulfone is included in the solution at a concentration of approximately 1 to 15 percent by weight.

51. A method according to claim 46, wherein the sulfur containing composition is tetramethylene sulfone; and wherein the tetramethylene sulfone is included in the solution at a concentration of approximately 1 to 15 percent by weight.

52. A method according to claim 49, wherein the sulfur containing composition is tetramethylene sulfone; and wherein the tetramethylene sulfone is included in the solution at a concentration of approximately 1 to 15 percent by weight.

53. A method according to claim 29, further comprising adding a biocide.

54. A method according to claim 29, further comprising adding a glycol.

55. A method according to claim 54, wherein the glycol is neopentyl glycol.

56. A method according to claim 32, wherein the step of adding the base to the solution is carried out prior the step of adding the dye component to the solution.

57. A method according to claim 56 wherein the buffer is aqueous sodium hydroxide.

58. A dye solution suitable for ink jet printing comprising:
a dye component; and
a polyethylene imine polymer selected from the group consisting of
(a) a hydroxyethylated polyethylene imine polymer having incorporated therein approximately 10–55% hydroxyethyl groups by weight;
(b) a hydroxypropylated polyethylene imine polymer;
(c) an epichlorohydrin-modified polyethylene imine polymer;
(d) a hydroxybutylated polyethylene imine polymer; and
(e) a glycidol-modified polyethylene imine polymer.

59. A method for the production of a dye solution suitable for ink jet printing comprising:
(i) obtaining a dye component and a polyethylene imine polymer selected from the group consisting of:
(a) a hydroxyethylated polyethylene imine polymer having incorporated therein approximately 10–55% hydroxyethyl groups by weight;
(b) a hydroxypropylated polyethylene imine polymer;
(c) an epichlorohydrin-modified polyethylene imine polymer;
(d) a hydroxybutylated polyethylene imine polymer; and
(e) a glycidol-modified polyethylene imine polymer.

60. A dye solution according to claim 58, wherein (b) the hydroxypropylated polyethylene imine polymer in (b) is formed from a polyethylene imine polymer having an average molecular weight less then 1000.

61. A method according to claim 59, wherein the hydroxypropylated polyethylene imine polymer in (b) is formed from a polyethylene imine polymer having an average molecular weight less then 1000.

* * * * *

UNITED STATES PATENT AND TRADEMARK OFFICE
CERTIFICATE OF CORRECTION

PATENT NO. : 5,364,462
DATED : November 15, 1994
INVENTOR(S) : Richard Crystal and Raymond Geffre It is certified that error appears in the above-indentified patent and that said Letters Patent is hereby corrected as shown below:

column 7, line 1      "let" should be --jet--
column 7, line 28     "claim 3" should be --claim 2--

Signed and Sealed this

Seventeenth Day of January, 1995

Attest:

BRUCE LEHMAN

*Attesting Officer*          *Commissioner of Patents and Trademarks*